United States Patent
Chen et al.

(10) Patent No.: US 11,669,250 B2
(45) Date of Patent: Jun. 6, 2023

(54) METHOD, DEVICE, AND COMPUTER PROGRAM PRODUCT FOR MANAGING WEAR LEVEL OF STORAGE SYSTEM

(71) Applicant: EMC IP Holding Company LLC, Hopkinton, MA (US)

(72) Inventors: Chi Chen, Chengdu (CN); Huijuan Fan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 210 days.

(21) Appl. No.: 17/193,184

(22) Filed: Mar. 5, 2021

(65) Prior Publication Data
US 2022/0129167 A1 Apr. 28, 2022

(30) Foreign Application Priority Data
Oct. 22, 2020 (CN) .......................... 202011138136.0

(51) Int. Cl.
*G06F 3/06* (2006.01)
*G06F 12/02* (2006.01)

(52) U.S. Cl.
CPC .......... *G06F 3/0616* (2013.01); *G06F 3/0647* (2013.01); *G06F 3/0683* (2013.01); *G06F 12/0246* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 7,107,491 B2 | 9/2006 | Graichen et al. | |
| 7,373,559 B2 | 5/2008 | Guha | |
| 8,639,877 B2 | 1/2014 | Benhase et al. | |
| 11,209,988 B2 | 12/2021 | Lyu | |
| 2016/0180959 A1* | 6/2016 | Darragh ................. | G11C 16/12 365/185.09 |
| 2021/0342085 A1 | 11/2021 | Kang et al. | |

* cited by examiner

*Primary Examiner* — Michael Alsip
(74) *Attorney, Agent, or Firm* — BainwoodHuang

(57) ABSTRACT

Techniques manage a wear degree of a storage system. Such techniques involve: receiving respectively, for multiple storage devices in the storage system, multiple access histories of the multiple storage devices in a previous time period; determining respectively multiple wear increments of the multiple storage devices at a future time point based on the multiple access histories of the multiple storage devices; acquiring a wear balance degree of the storage system at the future time point based on the multiple wear increments of the multiple storage devices at the future time point; and migrating data among the multiple storage devices in response to determining that the wear balance degree satisfies a preset condition. Accordingly, it is possible to determine the wear degree of each storage device in the storage system more accurately and ensure that the wear degree of each storage device is in a balanced state.

20 Claims, 10 Drawing Sheets

METHOD, DEVICE, AND COMPUTER PROGRAM PRODUCT FOR MANAGING WEAR LEVEL OF STORAGE SYSTEM

CROSS-REFERENCE TO RELATED APPLICATION

This application claims priority to Chinese Patent Application No. CN202011138136.0, on file at the China National Intellectual Property Administration (CNIPA), having a filing date of Oct. 22, 2020, and having "METHOD, DEVICE, AND COMPUTER PROGRAM PRODUCT FOR MANAGING WEAR LEVEL OF STORAGE SYSTEM" as a title, the contents and teachings of which are herein incorporated by reference in their entirety.

TECHNICAL FIELD

Implementations of the present disclosure relate to storage management, and more particularly, to a method, a device, and a computer program product for managing a wear degree of a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on the Redundant Array of Independent Disks (RAID) have been developed to improve data reliability. When one or more disks in a storage system malfunction, data in the malfunctioning disks can be reconstructed from data on other normally operating disks.

The Mapped RAID has been developed at present. In this mapped RAID, disk is a logical concept and may include multiple extents. Multiple extents included in a logical disk can be distributed on different physical storage devices in a resource pool. For multiple extents in one stripe of the mapped RAID, the multiple extents should be distributed on different physical storage devices. This makes it possible to perform, when a physical storage device where one of the multiple extents is located malfunctions, a reconstruction operation to recover data from physical storage devices where other extents are located. During the operation of the storage system, due to differences in loads of data being accessed in various storage devices, wear degrees of the storage devices will also be different. In this case, how to manage workloads of the storage devices so that the wear degrees of the storage devices remain similar has become a technical problem.

SUMMARY OF THE INVENTION

Therefore, it is desirable to develop and implement a technical solution for managing a wear degree of a storage system in a more effective manner. It is desirable that this technical solution is compatible with existing storage systems, and by modifying various configurations of the existing storage systems, the wear degree balancing of the storage systems may be implemented in a more effective manner.

According to a first aspect of the present disclosure, a method for managing a wear degree of a storage system is provided. The method includes: receiving respectively, for multiple storage devices in the storage system, multiple access histories of the multiple storage devices in a previous time period; determining respectively multiple wear increments of the multiple storage devices at a future time point based on the multiple access histories of the multiple storage devices; acquiring a wear balance degree of the storage system at the future time point based on the multiple wear increments of the multiple storage devices at the future time point; and migrating data among the multiple storage devices of the storage system in response to determining that the wear balance degree satisfies a preset condition.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

The features, advantages, and other aspects of respective implementations of the present disclosure will become more apparent from the following detailed description and in conjunction with the accompanying drawings. Certain implementations of the present disclosure are shown herein by way of example and not limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure can be fully conveyed to those skilled in the art.

As used herein, the term "including" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," etc., may refer to different or the same objects. Other explicit and implicit definitions may also be included below.

In the context of the present disclosure, a storage system may be a RAID-based storage system. The RAID-based storage system may combine multiple storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are multiple standards for RAID, such as RAID-1, RAID-2, RAID-3, RAID-4, RAID-5, RAID-6, RAID-10, RAID-50, and so on.

Figure 1A:
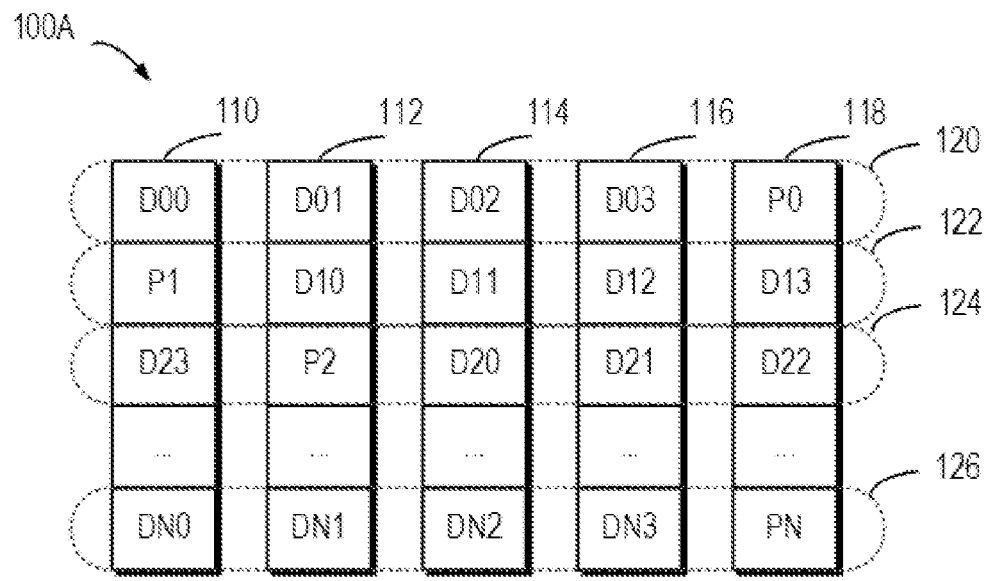
FIGS. 1A and 1B respectively schematically illustrate block diagrams of a storage system in which implementations of the present disclosure may be implemented.

FIG. 1A schematically illustrates a schematic diagram of storage system 100A in which a method of the present disclosure may be implemented. In the storage system shown in FIG. 1A, a RAID-5 (4D+1P, where 4D represents that the storage system includes four storage devices for storing data, and 1P represents that the storage system includes one storage device for storing a P parity) array including five independent storage devices (110, 112, 114, 116, and 118) is used as an example to illustrate the working principle of RAID. It should be noted that although five storage devices are schematically illustrated in FIG. 1A, more or fewer storage devices may also be included in other implementations depending on different RAID levels. Although stripes 120, 122, 124, . . . , 126 are shown in FIG. 1A, a RAID system may also include different numbers of stripes in other examples.

In RAID, a stripe may span multiple physical storage devices (e.g., stripe 120 spans storage devices 110, 112, 114, 116, and 118). Stripe may be simply understood as a storage area that satisfies a certain address range in the multiple storage devices. Data stored in stripe 120 include multiple parts: data block D00 stored on storage device 110, data block D01 stored on storage device 112, data block D02 stored on storage device 114, data block D03 stored on storage device 116, and data block P0 stored on storage device 118. In this example, data blocks D00, D01, D02, and D03 are stored data, while data block P0 is the P parity of the stored data.

The manner in which data is stored in other stripes 122 and 124 is also similar to that in stripe 120, except that parities related to other data blocks may be stored on a storage device different from storage device 118. In this way, when one of multiple storage devices 110, 112, 114, 116, and 118 fails, data in the failed device may be recovered from other normal storage devices.

Figure 1B:
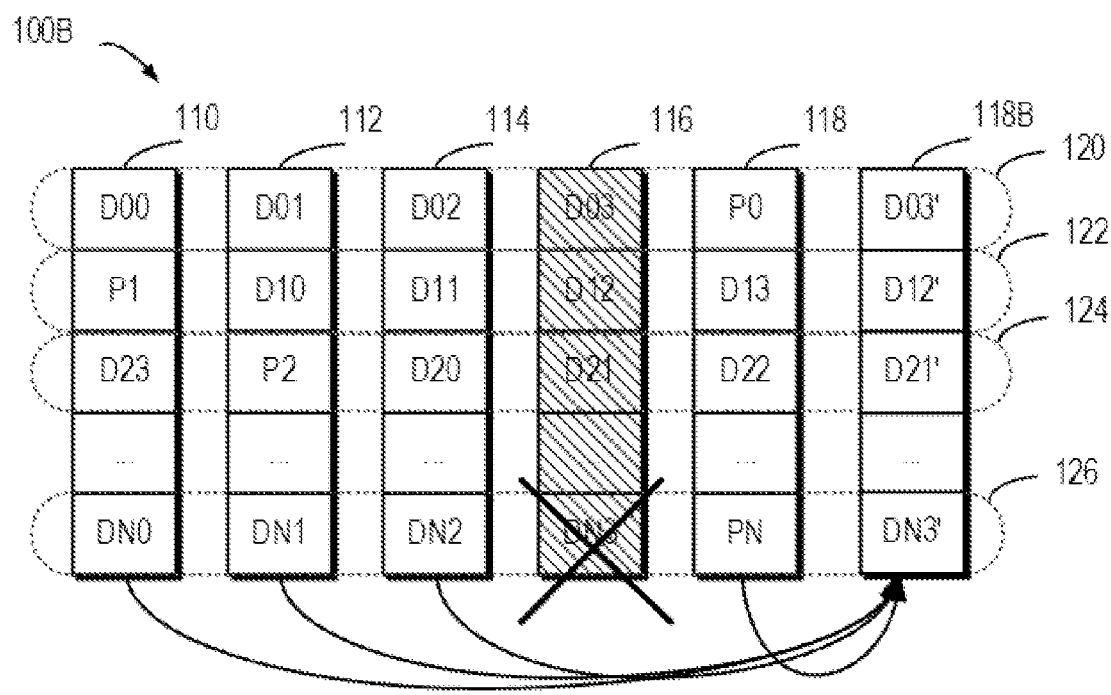

FIG. 1B schematically illustrates schematic diagram 100B of a reconstruction process of storage system 110A. As shown in FIG. 1B, when one storage device (for example, storage device 116 shown in hatching) fails, data may be recovered from multiple remaining storage devices 110, 112, 114, and 118 that operate normally. At this time, new backup storage device 118B may be added into RAID to replace storage device 118. In this way, the recovered data may be written to 118B and the reconstruction of the system may be realized.

It should be noted that although a RAID-5 storage system including 5 storage devices (wherein 4 storage devices (4D) are used for data storage and 1 storage device (1P) is used for parity storage) is described above with reference to FIGS. 1A and 1B, according to definitions of other RAID levels, there may also be storage systems that include other numbers of storage devices. For example, based on the definition of RAID-6, two storage devices may be used to store parities P and Q respectively. For another example, based on the definition of a triple-parity RAID, three storage devices may be used to store parities P, Q, and R respectively.

Figure 2:
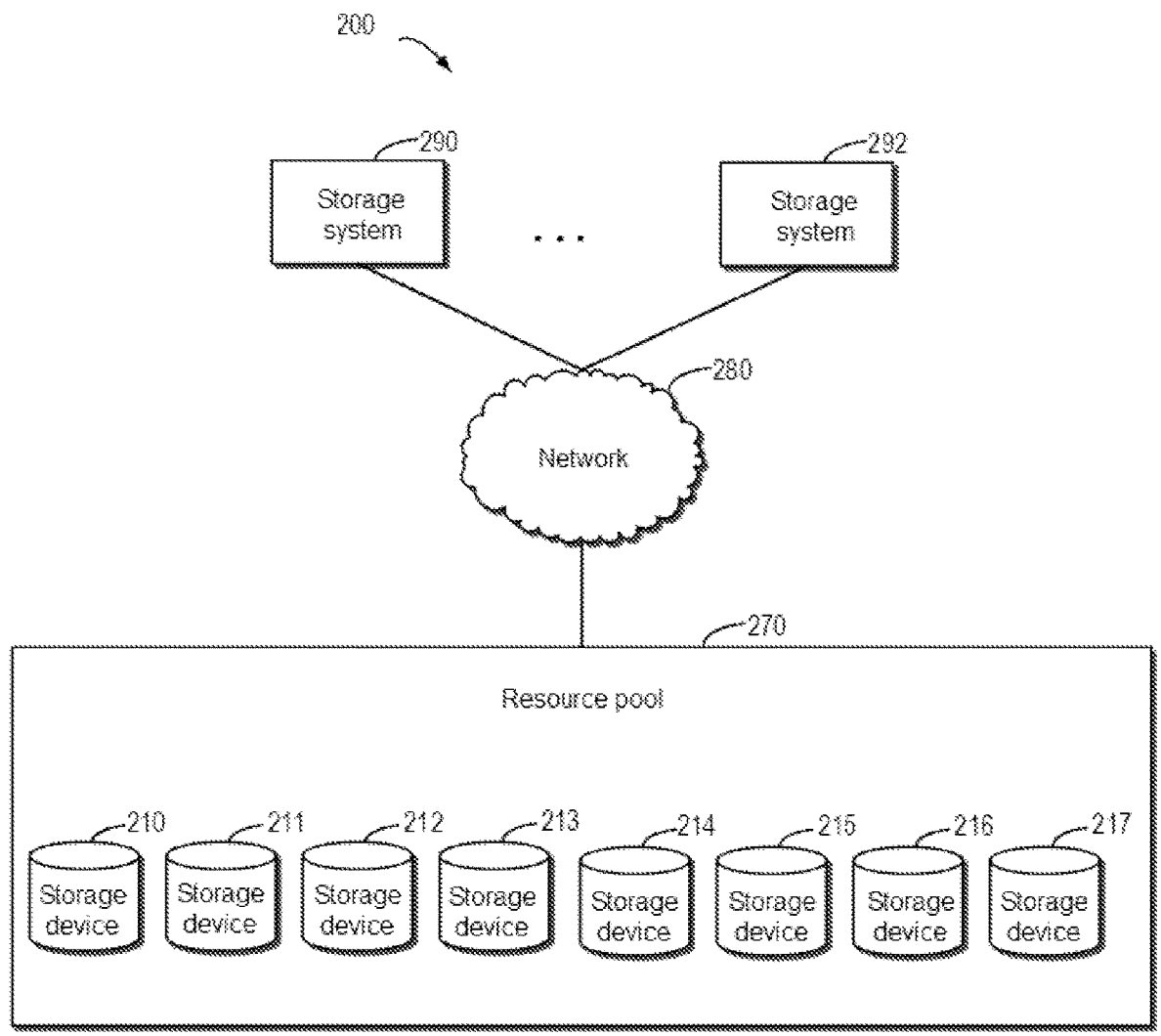
FIG. 2 schematically illustrates a block diagram of an example environment in which implementations of the present disclosure may be implemented.

With the development of distributed storage technologies, storage devices 110, 112, 114, 116, and 118 in the storage system shown in FIGS. 1A and 1B may no longer be limited to physical storage devices, but may be virtual storage devices. For example, all extents on storage device 110 may respectively come from different physical storage devices (hereinafter simply referred to as storage devices) in a resource pool. FIG. 2 schematically illustrates a block diagram of an example environment in which a method of the present disclosure may be implemented. As shown in FIG. 2, storage resource pool 270 may include multiple physical storage devices 210, 211, 212, 213, 214, 215, 216, and 217. In this case, storage spaces in the multiple storage devices may be allocated to multiple storage systems 290, . . . , 292 of users. In this case, storage systems 290, . . . , 292 of users may access the storage spaces in all the storage devices in storage resource pool 270 via network 280. It will be understood that although FIG. 2 only schematically illustrates the case where storage resource pool 270 includes 8 storage devices, according to an example implementation of the present disclosure, storage resource pool 270 may also include more or fewer storage devices.

Figure 3:
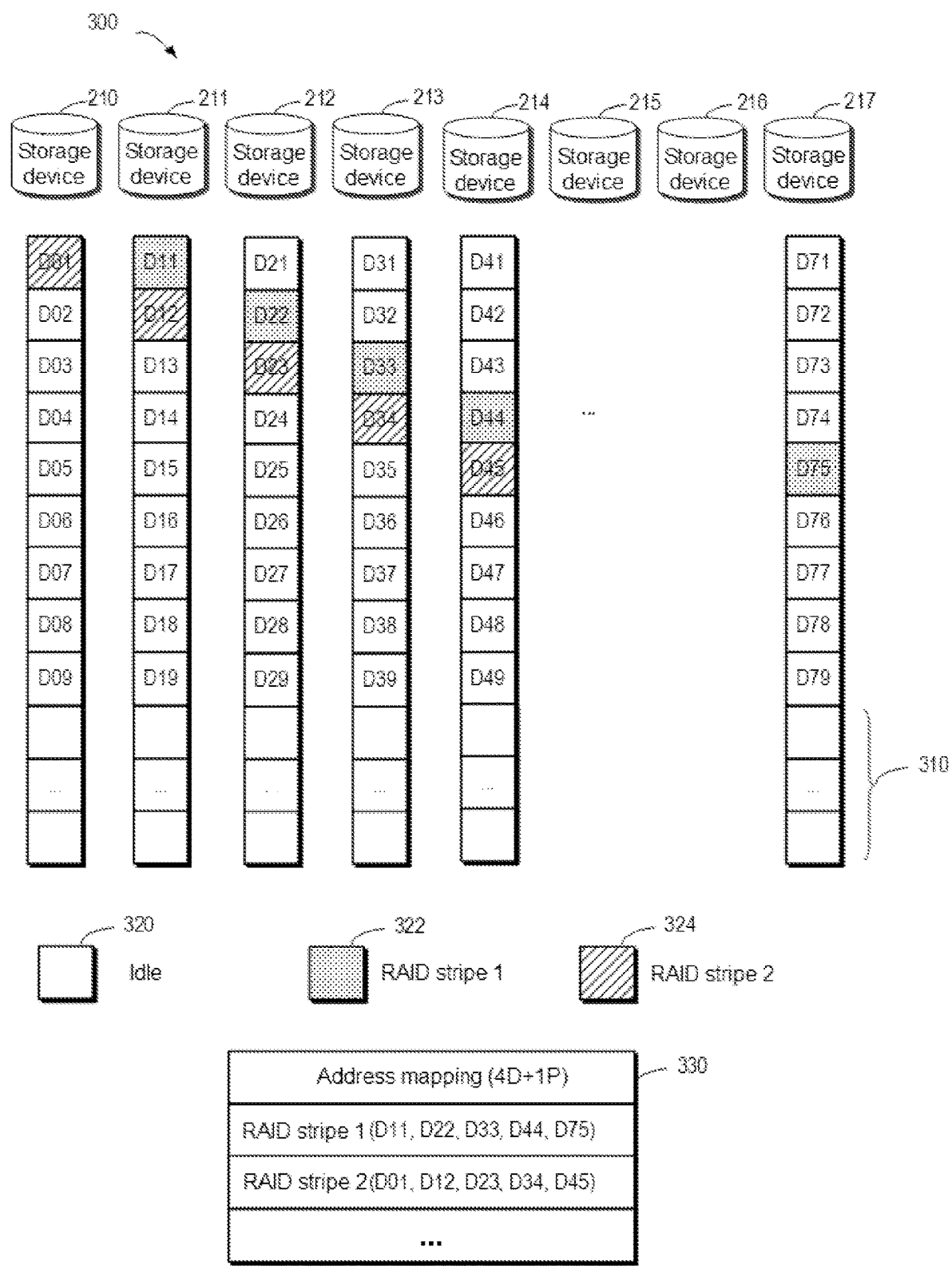
FIG. 3 schematically illustrates a diagram of a storage resource pool in FIG. 2.

FIG. 3 schematically illustrates a diagram of more information of storage resource pool 270 shown in FIG. 2. Resource pool 270 may include multiple storage devices 210 to 217. Each storage device may include multiple extents, where legend 320 represents an idle extent, legend 322 represents an extent for RAID stripe 1, and legend 324 represents an extent for RAID stripe 2. In this case, extents D11, D22, D33, and D44 for RAID stripe 1 are used to store data blocks of the stripe respectively, and extent D75 is used to store a parity of data. Extents D01, D12, D23, and D34 for RAID stripe 2 are used to store data blocks of the stripe respectively, and extent D45 is used to store a parity of data.

As shown in FIG. 3, address mapping 330 shows an association relationship between stripes and addresses of extents in the stripes. For example, RAID stripe 1 may include 5 extents: D11, D22, D33, D44, and D75, and these 5 extents are located in storage devices 211, 212, 213, 214, and 217, respectively. Specifically, as shown in FIG. 3, extent D11 is the first extent in storage device 211, and extent D22 is the second extent in storage device 212. As shown in FIG. 3, there may also be reserved idle part 310 in each storage device, so that when one storage device in the resource pool fails, extents in idle part 310 in each storage device may be selected to reconstruct all extents in the failed storage device.

It should be noted that FIG. 3 only uses a 4D+1P RAID-5 storage system as an example to show how the extents in the stripes are distributed in the multiple storage systems in the resource pool. When another RAID level is adopted, those skilled in the art can implement specific details based on the above principles. For example, in a 6D+1P+1Q RAID-6 storage system, 8 extents in each stripe may be distributed on the multiple storage devices.

It will be understood that, with the operation of the storage system, use loads of the multiple storage devices will be different, which will cause relatively high workloads for certain storage devices. Uneven workloads may cause the use rates and read/write volumes of these storage devices to be much higher than those of other storage devices. Since there is an upper limit on the number of reads and writes of a storage device, excessively high read/write volumes will cause some storage devices to be excessively worn compared with other storage devices. Further, it may also cause these storage devices to face a potentially higher risk of data loss. It will be understood that the wear degree is an index representing the service life of a storage device, and a high wear degree means that the remaining usage time of the storage device is reduced. When the wear degree reaches a certain threshold, it means that the life of the storage device is about to end, and the storage device needs to be replaced in time.

Currently, technical solutions have been proposed, which can be applied to perform wear degree balancing between multiple storage devices in a storage system based on use loads of the multiple storage devices. However, the performance of these technical solutions is not satisfactory, and there is no guarantee that wear degrees of the individual storage devices will remain as similar as possible. In one solution, the load balancing process can be triggered based on the wear degrees of the multiple storage devices in the storage system. For example, when a certain storage device is found to have a high wear degree, data in this storage device can be moved to a storage device in the storage system that has a low wear degree. Typically, there are fluctuations in data access in the storage system, and if the load balancing process is triggered based on a current measured wear degree, it may be difficult to perform load balancing operations effectively.

In the technical solutions where load balancing is performed periodically, it is assumed that the current storage system is at the valley of the access load, and based on the current wear degree, it can be determined not to perform the load balancing process. Assuming that a peak of data access occurs immediately after the current time point, this may cause one or more of the multiple storage devices to be severely worn. For another example, in a technical solution in which whether or not to perform the load balancing process is determined based on the access load of the current storage system, assuming that the access load of the current storage system is low and thus the wear rate is low, it may be determined at this moment that the load balancing process is performed only for certain storage devices. The peak of access load may occur immediately after the load balancing process has been performed. This may lead to obvious inconsistencies in increments of the wear degrees of the individual storage devices before the next load balancing process, which in turn can lead to differences in the wear degrees of the individual storage devices.

In order to at least partially solve the deficiencies in the technical solutions described above, according to an example implementation of the present disclosure, a future wear increment of a storage device is determined based on an access history of the storage device, and it is thereby determined whether or not to perform a load balancing process. With the example implementation of the present disclosure, the wear increment of each storage device can be effectively predicted based on the statistics on historical data, thereby determining, in a more accurate and effective manner, whether to perform a load balancing process. Further, in a time period between this load balancing and the next load balancing, it can be ensured that the wear degree of each storage device is in an acceptable range. In this way, it is ensured that the wear degrees of all the multiple storage devices are maintained at a relatively even level throughout the operation period of the storage system.

Figure 4:
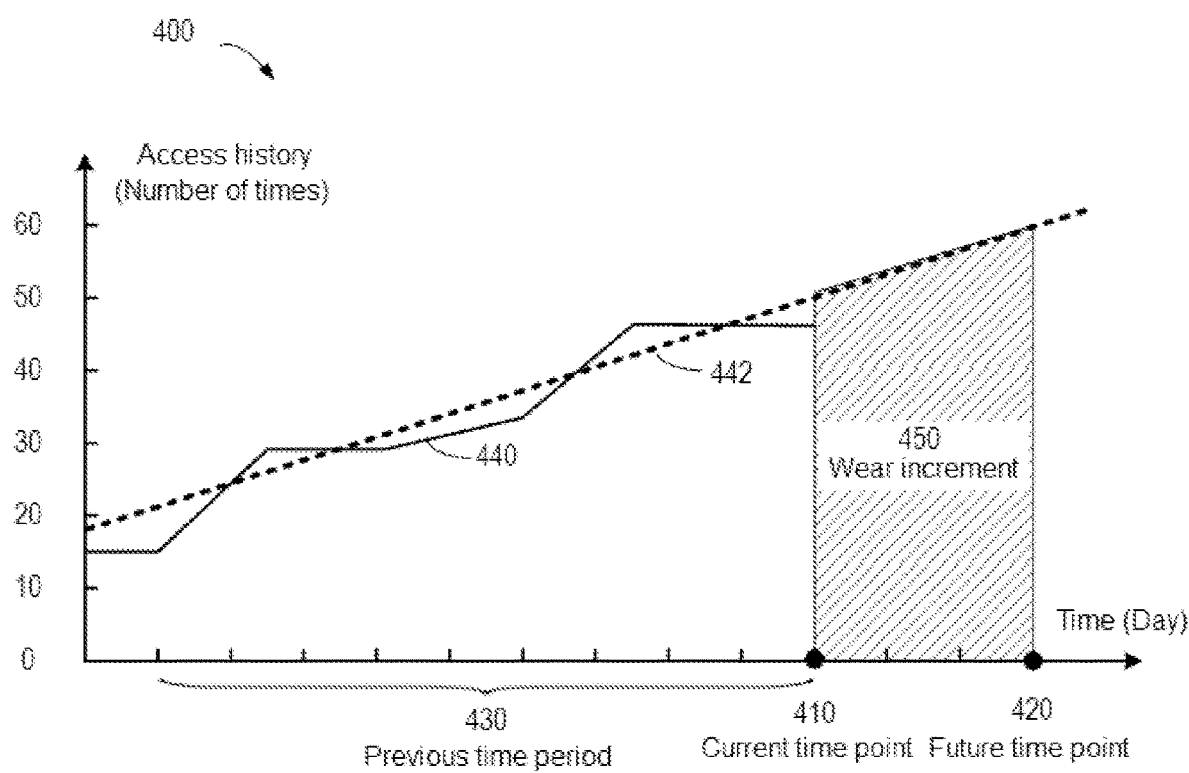
FIG. 4 schematically illustrates a block diagram of a process for determining a wear increment of a storage device according to an implementation of the present disclosure.

First, an overview of a method according to an example implementation of the present disclosure will be described with reference to FIG. 4. FIG. 4 schematically illustrates a block diagram of process 400 for determining a wear increment of a storage device according to an implementation of the present disclosure. It will be understood that the wear degree of a storage device is closely related to the access load of the storage device, and the higher the access load, the higher the wear degree. FIG. 4 only illustrates a process of determining the wear increment of one storage device, similar operations can be performed for other storage devices in order to determine the wear increment of each storage device in the storage system. As shown in FIG. 4, the horizontal coordinate represents time (e.g., in "day," "week," "month," etc.), and the vertical coordinate represents the access history (e.g., in the number of accesses) for a storage device.

FIG. 4 illustrates a technical solution in which the load balancing process is performed periodically, where reference numeral 410 represents a current time point at which the current round of load balancing process is to be performed, and reference numeral 420 represents a future time point at which the next round of load balancing process is to be performed. According to an example implementation of the present disclosure, access history 440 of a storage device in multiple storage devices in previous time period 430 may be determined. Further, wear increment 450 of this storage device at future time point 420 may be determined based on access history 440. For example, function 442 describing a change trend of the access history may be fitted based on multiple access loads at multiple time points in access history 440, thereby determining wear increment 450 resulting from the access loads in the time period between current time point 410 and future time point 420.

The wear balance degree of the storage system at future time point 420 may be predicted based on the wear increments of the multiple storage devices. For example, the average value of the wear increments of the multiple storage devices may be determined, and the wear balance degree of the storage system may be determined based on the wear increment of each storage device and the average value. If this wear balance degree satisfies a preset condition, it means that the wear is not consistent across the storage devices, and therefore, data needs to be migrated across the multiple storage devices in the storage system.

With the example implementation of the present disclosure, whether a load balancing process needs to be triggered can be determined based on the predicted wear increment of each storage device at future time point 420. Compared with determining, based on the current wear degrees and/or access loads, whether to trigger the load balancing process in existing technical solutions, the predicted values of the wear increments can more accurately reflect the wear conditions of the multiple storage devices at future time point 420, and thus it can be determined, in a more accurate manner, whether or not to perform the load balancing process. Further, after the load balancing process has been triggered and performed, the storage system can be ensured to be in a well-balanced state for a time period until the next load balancing is performed (i.e., a time period between current time point 410 and future time point 420). In other words, the balance degree of the wear conditions of the multiple storage devices can be maintained in an acceptable range over the future time period. Even if it is determined at this time not to perform the load balancing process, since this determination is performed based on the predicted values of the wear increments at future time point 420, the multiple storage devices may still maintain similar wear degrees over the future time period.

Figure 5:
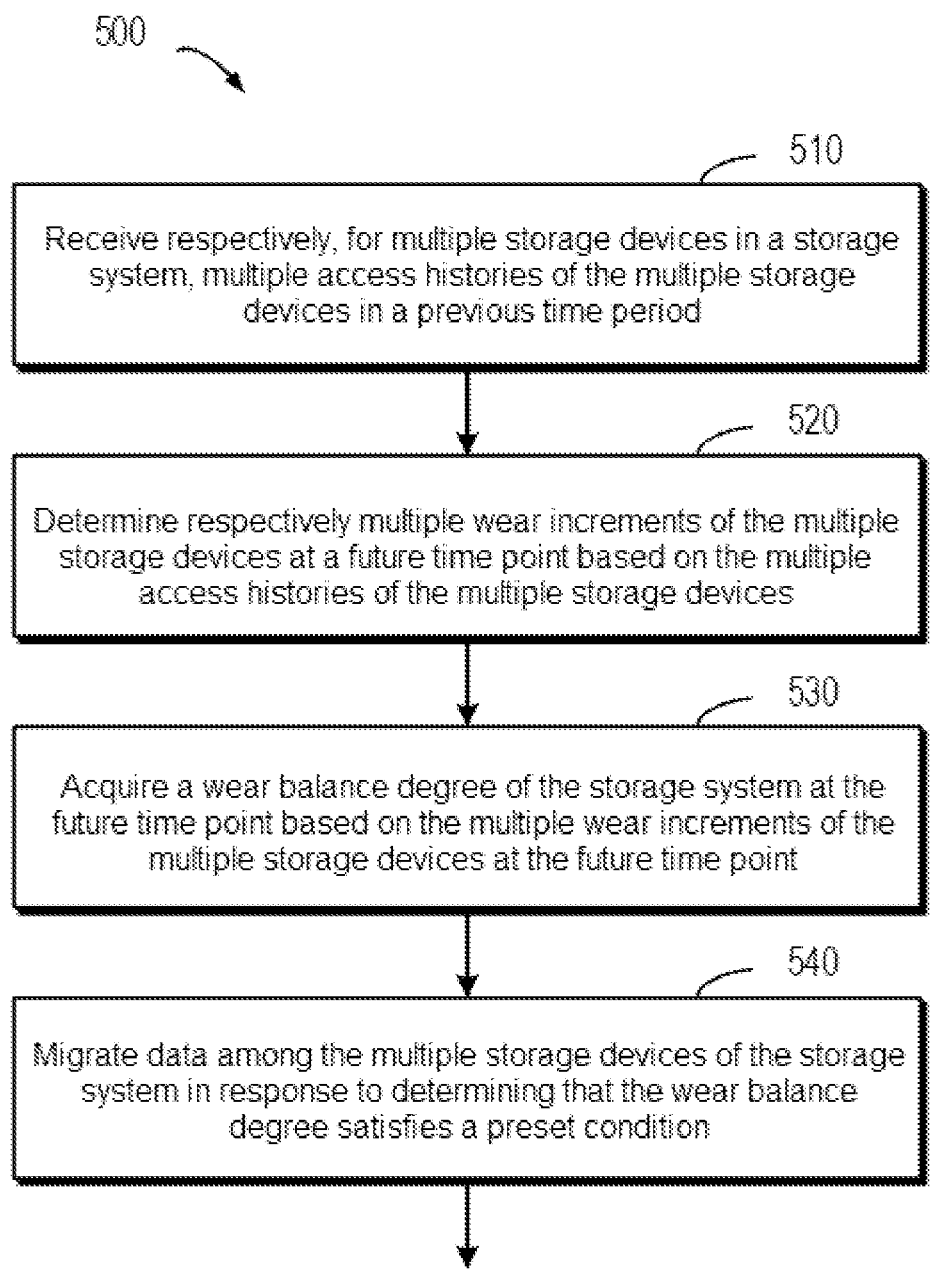
FIG. 5 schematically illustrates a block diagram of a method for managing a wear degree of a storage system according to an implementation manner of the present disclosure.

Hereinafter, more details of the method according to an example implementation of the present disclosure will be described with reference to FIG. 5. FIG. 5 schematically illustrates a block diagram of method 500 for managing a balance degree of a storage system according to an implementation of the present disclosure. At block 510, for multiple storage devices in the storage system, multiple access histories of the multiple storage devices in a previous time period are respectively received. Here, the access history can be acquired respectively for each of the multiple storage devices. For the sake of simplicity, only one storage device will be described as an example below.

More details about previous time period 430 will be described by returning to FIG. 4. To more clearly capture the change pattern of the access load, the length of previous time period 430 may be greater than the length between current time point 410 and future time point 420. Assuming that each scale in the horizontal coordinate of FIG. 4 represents 1 week and that the next load balancing process is scheduled to be performed at future time point 420 (3 weeks in the future), the length of previous time period 430 can be set to be greater than 3 weeks at this time. According to an example implementation of the present disclosure, the length of previous time period 430 may be set to 9 weeks (or another time length). At this time, the access history in the past 9 weeks can be acquired.

It will be understood that although FIG. 4 schematically illustrates that previous time period 430 is immediately adjacent to current time point 410, according to an example implementation of the present disclosure, there may be a time interval between previous time period 430 and current time point 410. Access history 440 herein may include multiple access loads collected respectively at multiple time points in previous time period 430.

Still referring to FIG. 5, at block 520, multiple wear increments 450 of the multiple storage devices at future time point 420 are determined respectively based on the multiple access histories of the multiple storage devices. Specifically, wear increment 450 can be determined for each of the multiple storage devices. Since the access load of the storage device varies, in order to more accurately determine wear increment 450, a change pattern of the multiple access loads of the storage device at the multiple time points in previous time period 430 may first be determined. In general, the change pattern may include a trend change pattern (e.g., incremental or decremental), a periodic change pattern, and an irregular change pattern. Hereinafter, how to determine the wear increment will be described for each of the above change patterns, respectively.

According to an example implementation of the present disclosure, the wear increment history of the storage device in previous time period 430 may be determined based on the multiple access loads and the change pattern. The situation where the change pattern is a trend change pattern will be described by returning to FIG. 4. The change pattern of the access load can be determined based on existing data analysis methods. Further, if it is determined that the change pattern of the storage device is the trend change pattern, the wear increment history (for example, function 442 expressed by an oblique line) may be determined based on a linear fitting of the multiple access loads. The oblique line here may represent a change trend of the access load, and thus the access load of the storage device at future time point 420 can be predicted based on this oblique line.

It will be understood that the wear degree of a storage device is closely related to the access load of the storage device, and the higher the access load, the higher the wear degree. Therefore, the access loads generated in the future time period may be used to determine wear increment 450 of the storage device. Specifically, the wear increment of the storage device at future time point 420 may be determined based on the wear increment history and future time point 420. In the incremental trend change pattern shown in FIG. 4, oblique line 442 represents the change trend of the access load, and thus wear increment 450 can be determined based on the portion that is below oblique line 442 and between current time point 410 and future time point 420.

With the example implementation of the present disclosure, wear increment 450 may be determined in a more accurate and reliable manner. According to existing technical solutions, the calculating formula for determining the wear increment at future time point 420 based on the access load (e.g., 50) at current time point 410 can be expressed as 50*3=150 (i.e., the number of accesses at the current time point * the length of the future time period). According to an example implementation of the present disclosure, wear increment 450 determined based on the wear increment history expressed by an oblique line may be expressed as (50+60)/2*3=165. It can be seen that wear increment 450 determined according to the example implementation of the present disclosure is more consistent with the change trend of the historical access loads in the storage system, and thus wear increment 450 at future time point 420 can be better predicted.

It will be understood that FIG. 4 merely schematically illustrates an example of an incremental change pattern, and according to an example implementation of the present disclosure, the trend change pattern may include a decremental pattern or a holding pattern (i.e., the change trend is not significant and remains essentially unchanged). The processing of other trend change patterns is similar and is therefore not repeated.

Figure 6:
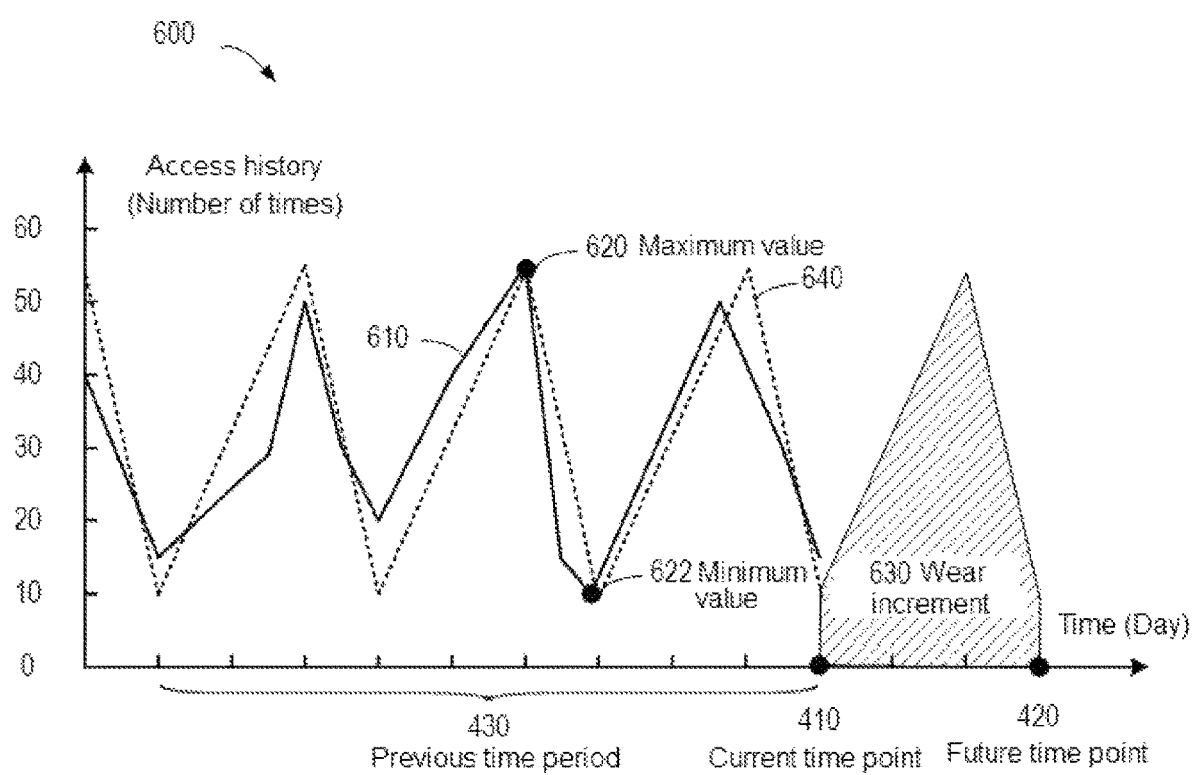
FIG. 6 schematically illustrates a block diagram of a process for determining a wear increment of a storage device according to an implementation of the present disclosure.

According to an example implementation of the present disclosure, the wear increment history may be determined based on an extreme value among the multiple access loads if it is determined that the change pattern of the storage device is a periodic change pattern. Hereinafter, specific details about the periodic change pattern will be described with reference to FIG. 6. FIG. 6 schematically illustrates a block diagram of process 600 for determining a wear increment of a storage device according to an implementation of the present disclosure. FIG. 6 is similar to FIG. 4, except that access history 610 shown in FIG. 6 changes periodically. Based on data analysis, it can be seen that the change cycle of access history 610 is 3 weeks. At this time, wear increment history 640 (shown by a dotted line) can be determined based on maximum value 620 and minimum value 622 in access history 610.

Further, based on a difference (3 weeks) between future time point 420 and current time point 410, a time period corresponding to the difference may be determined in previous time period 430. As shown in FIG. 6, the future time period corresponds to exactly one change cycle (3 weeks), so at this point it can be determined that wear increment 630 in the future time period is exactly the increment in one cycle. Then, wear increment 630 of the storage device at future time point 420 may be determined based on the historical increments shown in the wear increment history and the location of the future time period relative to the change cycle. According to existing technical solutions, the calculating formula for determining the wear increment at future time point 420 based on the access load (e.g., 10) at current time point 410 can be expressed as 10*3=30. Since current time point 410 happens to be at the valley of the cycle, it will produce a large error. According to an example implementation of the present disclosure, wear increment 630 determined based on periodic changes shown in wear increment history 640 may be expressed as (10+55)/2*3=112.5. It can be seen that wear increment 630 determined according to the example implementation of the present disclosure adequately takes into account the peak and valley in the cycle, and the length of the cycle, and thus can better predict wear increment 630 at future time point 420.

It will be understood that, although FIG. 6 illustrates an example in which the future time period happens to be one change cycle of the access load, according to an example implementation of the present disclosure, the future time period may be greater than or less than the change cycle of the access load, and the future time period may begin at a location different from the starting point of the cycle. At this time, the corresponding wear increment can be determined based on the offset of the future time period in the cycle.

Figure 7:
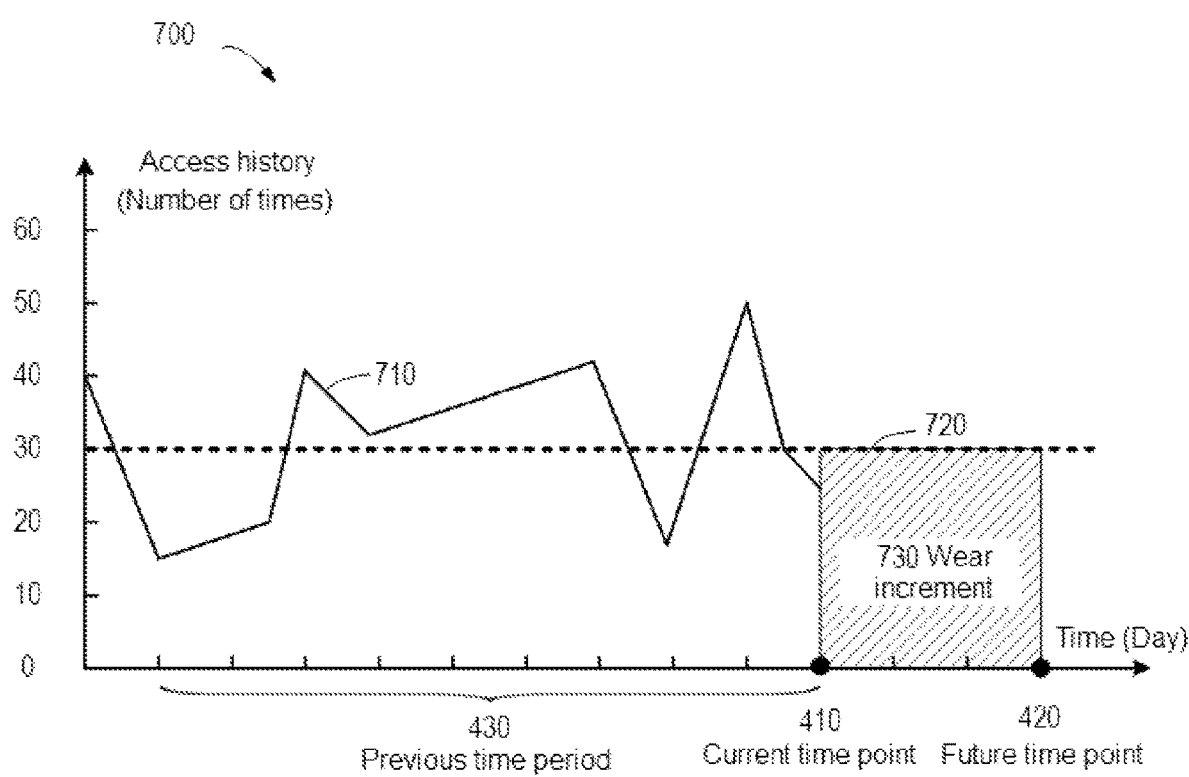
FIG. 7 schematically illustrates a block diagram of a process for determining a wear increment of a storage device according to an implementation of the present disclosure.

According to an example implementation of the present disclosure, the wear increment history may be determined based on the multiple access loads if it is determined that the change pattern of the storage device is an irregular change pattern. Hereinafter, specific details about the irregular change pattern will be described with reference to FIG. 7. FIG. 7 schematically illustrates a block diagram of process 700 for determining a wear increment of a storage device according to an implementation of the present disclosure.

FIG. 7 is similar to FIG. 4, except that access history 710 shown in FIG. 7 changes irregularly. Based on data analysis, it can be seen that if it is determined that there is no pattern in the change of access history 710, wear increment history 730 may be determined based on an accumulation of multiple access loads in access history 710. In other words, access history 710 may be integrated to determine the wear increment history in previous time period 430. Then, average value 720 of the wear increments may be determined based on the wear increment history, and wear increment 730 at future time point 420 may be determined based on this average value.

As shown in FIG. 7, according to existing technical solutions, the calculating formula for determining the wear increment at future time point 420 based on the access load (e.g., 25) at current time point 410 can be expressed as 25*3=75. According to an example implementation of the present disclosure, wear increment 730 determined based on the average value expressed by a straight line may be expressed as 30*3=90. It can be seen that wear increment 730 determined according to the example implementation of the present disclosure is more consistent with the historical access loads in the storage system, and thus wear increment 730 at future time point 420 can be better predicted.

The situations of determining the wear increment for the trend change pattern, the periodic change pattern, and the irregular change pattern have been described above with reference to FIGS. 4, 6, and 7, respectively. With the example implementation of the present disclosure, a corresponding wear increment can be determined based on different change patterns of the access load, respectively. In this way, the accuracy of determining the wear increment can be increased, thereby improving the performance of performing the load balancing process.

In the situation where the wear increments of the multiple storage devices have been determined respectively, the wear balance degree of the storage system may be determined based on the wear increments of the multiple storage devices. Hereinafter, more information about determining the wear balance degree will be described by returning to FIG. 5. At block 530 in FIG. 5, the wear balance degree of the storage system at future time point 420 is acquired based on the multiple wear increments of the multiple storage devices at future time point 420. Assuming that the storage system includes M storage devices, the wear balance degree of the storage system can be determined based on the following Formula 1.

$$\delta = \frac{\sqrt{\frac{\sum_{i=0}^{M-1}(W_{Disk\ i} - W_{Disk\ average})^2}{M-1}}}{W_{Disk\ average}} \quad \text{Formula 1}$$

where $\delta$ represents the wear balance degree of the storage system, M represents the number of the storage devices in the storage system, $W_{Disk\ i}$ represents the wear degree of the ith storage device determined based on the wear increments described above, and $W_{Disk\ average}$ represents the average value of the wear degrees of the storage devices. With the example implementation of the present disclosure, based on the wear increment at future time point 420, the wear balance degree of the storage system at future time point 420 can be determined in a more accurate and reliable manner. Determining, based on the more accurate and reliable wear balance degree, whether or not to perform a load balancing process can ensure that the wear degree of the storage system will remain in a balanced state until the next load balancing process. It will be understood that Formula 1 above merely schematically illustrates an example for determining a wear balance degree, which may be calculated based on other formulas according to an example implementation of the present disclosure.

At block 540, data is migrated among the multiple storage devices of the storage system in response to determining that the wear balance degree satisfies a preset condition. According to an example implementation of the present disclosure, this preset condition can be set based on a preset threshold. The larger the value of the wear balance degree determined based on Formula 1, the more uneven the wear degrees of the multiple storage devices; and the smaller the value of the wear balance degree determined based on Formula 1, the more uniform the wear degrees of the multiple storage devices.

According to an example implementation of the present disclosure, the preset threshold of 15% (or other values) can be specified. If the wear balance degree determined based on Formula 1 is higher than this threshold, it means that according to the access load change trend based on predictions, the balance degree of the storage system will be unbalanced before the next load balancing time point, and therefore the load balancing process should be performed immediately. If the wear balance degree determined based on Formula 1 is lower than this threshold, it means that according to the access load change trend based on predictions, the balance degree of the storage system will remain at an acceptable level until the next load balancing time point, and therefore the load balancing process may not be performed at this time. With the example implementation of the present disclosure, it is possible to determine, in a more accurate and effective manner, whether or not to perform load balancing.

After it has been determined that the load balancing process needs to be performed, a source storage device and a destination storage device may be selected from the multiple storage devices based on load balance indexes of storage devices in the multiple storage devices. Specifically, a storage device with a poorer or worst load balance index may be selected as the source storage device, and a storage device with a better or best load balance index may be selected as the destination storage device. Hereinafter, how to determine the load balance index of a storage device is first described.

In order to perform the load balancing process more efficiently, according to an example implementation of the present disclosure, the concept of load balance index of a storage device is proposed. The load balance index may include one or more factors: device correlation, device wear degree, and access load. Here, the device correlation represents the distribution of a set of stripes involved by the storage system between the storage device and other storage devices than the storage device. For convenience of description, hereinafter, more details of the example implementation of the present disclosure will be described using only a 4D+1P RAID stripe as an example of the stripe. The 4D+1P RAID stripe includes 5 extents, and data in the 5 extents are usually accessed in association. This results in increases in the access loads of 5 storage devices respectively including each of the 5 extents. In summary, for any two storage devices, the more stripes the two storage devices serve together, the greater the possibility that the two storage devices are accessed simultaneously, and the higher the access loads of the two storage devices. Therefore, two storage devices should be prevented from serving too many stripes at the same time.

According to an example implementation of the present disclosure, the device correlation of the storage device may be first determined. In the context of the present disclosure, M is used to represent the number of storage devices in the storage system, and N is used to represent the width of a stripe. Assuming that the storage system includes 8 storage devices 210 to 217, then M=8 at this moment. When a 4D+1P RAID is adopted, N=4+1=5. For the ith storage device and the jth storage device (i≠j) in the multiple storage devices, the correlation between the two storage devices can be expressed as $\gamma_{Disk\ i, Disk\ j}$. According to an example implementation of the present disclosure, the correlation of a storage device with respect to itself can be set to 0, that is $\gamma_{Disk\ i, Disk\ i}=0$. Hereinafter, how to determine the correlation $\gamma_{Disk\ i, Disk\ j}$ between the ith storage device and the jth storage device will be described with reference to FIG. 8.

Figure 8:
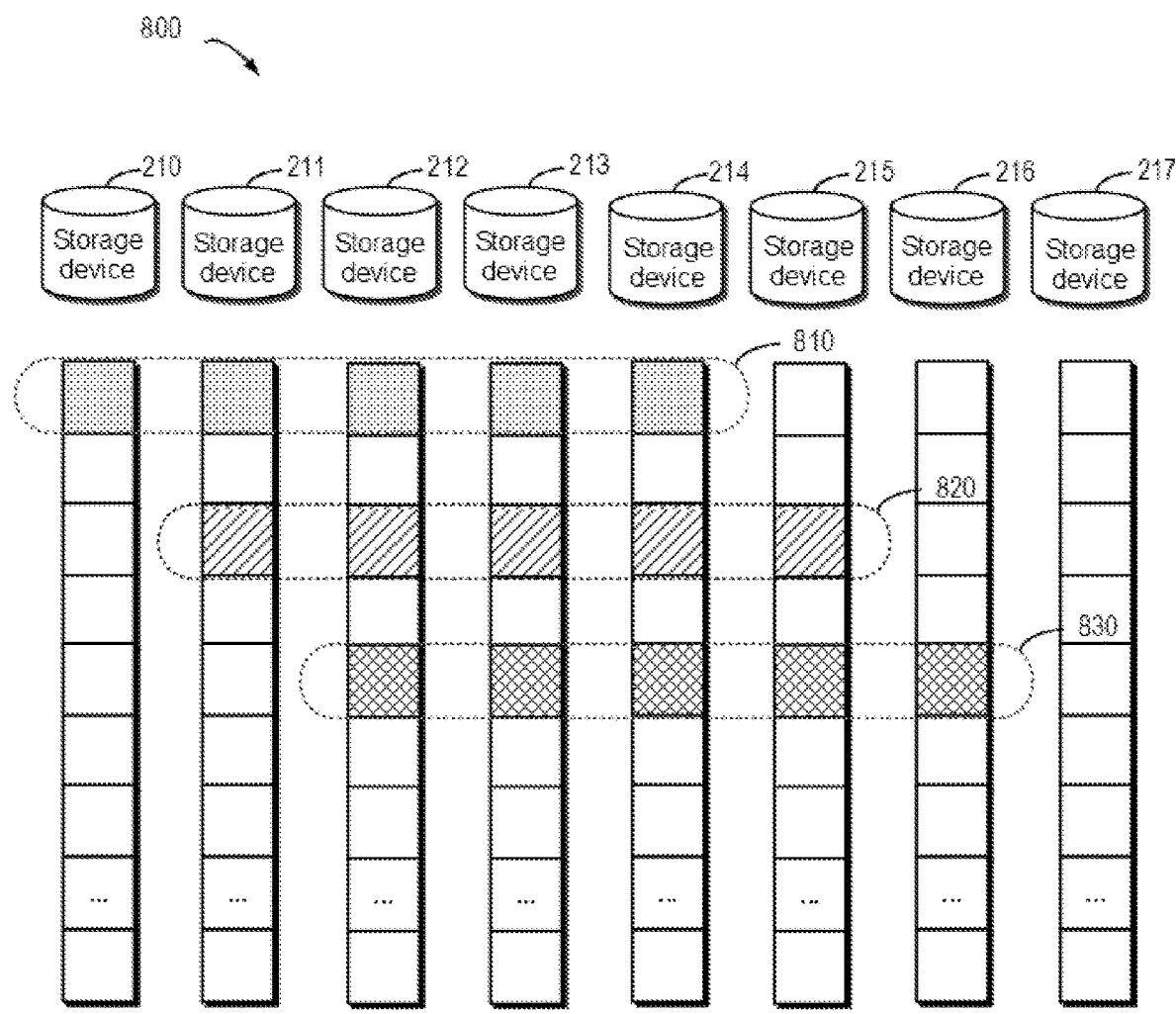
FIG. 8 schematically illustrates a block diagram of a process of determining a correlation between two storage devices according to an implementation of the present disclosure.

FIG. 8 schematically illustrates a block diagram of process 800 of determining a correlation between two storage devices according to an implementation of the present disclosure. As shown in FIG. 8, 3 stripes 810, 820, and 830 have been created in the storage system, and the correlation $\gamma_{Disk\ i, Disk\ j}$ may be determined based on the number of stripes that jointly involve the ith storage device and the jth storage device. If it is expected to determine a correlation between storage device 210 and storage device 211 (i.e., i=0, j=1), it may be found that only stripe 810 uses extents in storage device 210 and storage device 211 at the same time, and thus $\gamma_{Disk\ 0, Disk\ 1}=1$.

For another example, if it is expected to determine a correlation between storage device 211 and storage device 212 (i.e., i=1, j=2), it may be found that stripe 810 uses extents in storage device 210 and storage device 211 at the same time, and stripe 820 also uses extents in storage device 210 and storage device 211 at the same time, and thus $\gamma_{Disk\ 1, Disk\ 2}=2$. Similarly, a correlation between any two storage devices in the multiple storage devices may be determined. It will be understood that a mapping relationship between the stripes and the extents in the stripes may be conveniently obtained from address mapping 330 of the storage system. Thus, with the example implementation of the present disclosure, a correlation between any two storage devices may be determined in a simple and effective manner.

According to an example implementation of the present disclosure, a device correlation of a specific storage device in the multiple storage devices may be determined based on a correlation between two storage devices. Specifically, a correlation between the specific storage device and each of other storage devices than the specific storage device may be determined respectively. Furthermore, the device correlation of the specific storage device may be determined based on the determined multiple correlations.

According to an example implementation of the present disclosure, the device correlation may be set to be directly proportional to the correlations between the storage device and each of other storage devices. For example, for acquiring the multiple correlations, the device correlations can be determined based on a summation operation. With the example implementation of the present disclosure, the device correlation of the specific storage device may be determined based on the correlations between the specific storage device and other storage devices on the basis of simple mathematical operations.

Assuming that it is expected to determine a device correlation of the ith storage device, a correlation between the ith storage device and the other jth storage device ($0 \leq j \leq M-1$, and $i \neq j$) may be determined based on the method described above with reference to FIG. 8. According to an example implementation of the present disclosure, the device correlation $\gamma_{Disk\ i}$ of the ith storage device may be determined based on the following Formula 2:

$$\gamma_{Disk\ i} = \sum_{j=0}^{M-1} \gamma_{Disk\ i, Disk\ j} \qquad \text{Formula 2}$$

where $\gamma_{Disk\ i}$ represents the device correlation of the ith storage device, $\gamma_{Disk\ i, Disk\ j}$ represents the correlation between the ith storage device and the jth storage device, and M represents the number of storage devices in the resource pool. It will be understood that Formula 2 above only schematically illustrates a specific example for determining a device correlation. According to an example implementation of the present disclosure, other formulas may also be used to determine the device correlation. For example, the device correlation may be determined based on a product of multiple correlations.

According to an example implementation of the present disclosure, device correlations of the multiple storage devices may be respectively determined based on Formula 2 described above, and the load balance indexes of the storage devices may be determined based on the device correlations of the storage devices. For example, the load balance index $C_{Disk\ i}$ of the ith storage device may be determined based on the following Formula 3:

$$C_{Disk\ i} = \frac{\gamma_{Disk\ i}}{\sum_{j=0}^{M-1} \gamma_{Disk\ j}} \qquad \text{Formula 3}$$

where $C_{Disk\ i}$ represents the load balance index of the ith storage device, $\gamma_{Disk\ i}$ represents the device correlation of the ith storage device, and M represents the number of storage devices in the resource pool. With the example implementation of the present disclosure, the numerator part $\gamma_{Disk\ i}$ may represent the distribution of a set of stripes involving the ith storage device, and the denominator part $\sum_{j=0}^{M-1} \gamma_{Disk\ j}$ may represent the distribution of all stripes involving all the storage devices in the storage system, so a ratio of the two may accurately reflect the balance degree of the ith storage device in the aspect of stripe distribution.

It will be understood that the load balance index illustrated above only represents the impact of the stripe distribution on the performance of a storage device. According to an example implementation of the present disclosure, there may also be other factors that affect the workload. For example, when an access load of a storage device is high, the performance of the storage device will decrease. For another example, when a wear degree of a storage device is high, the reliability of the storage device will decrease.

According to an example implementation of the present disclosure, the load balance index may be updated based on the access load of the storage device. Specifically, the access load of the storage device may be determined, and access loads of the multiple storage devices may be determined respectively. The access load may have various representations. For example, at least any one of the following may be used to represent the access load: the number of accesses per unit time, the volume of data accesses per unit time, the total number of accesses, the total volume of data accesses, and so on. Then, the load balance index of the storage device may be updated based on the access load of the storage device and the access loads of the multiple storage devices. According to an example implementation of the present disclosure, the load balance index $C_{Disk\ i}$ of the ith storage device may be determined based on the following Formula 4.

$$C_{Disk\ i} = \omega_\gamma \cdot \frac{\gamma_{Disk\ i}}{\sum_{j=0}^{M-1} \gamma_{Disk\ j}} + \omega_T \cdot \frac{T_{Disk\ i}}{\sum_{j=0}^{M-1} T_{Disk\ j}} \qquad \text{Formula 4}$$

where $C_{Disk\ i}$ represents the load balance index of the ith storage device, $\gamma_{Disk\ i}$ represents the device correlation of the ith storage device, $\gamma_{Disk\ j}$ represents the device correlation of the jth storage device, M represents the number of storage devices in the resource pool, $T_{Disk\ i}$ represents the access load of the ith storage device, $\sum_{j=0}^{M-1} T_{Disk\ j}$ represents the sum of the access loads of all the M storage devices, and $\omega_\gamma$ and $\omega_T$ respectively represent weights related to device correlation and access load. It will be understood that Formula 4 above is only a schematic way to determine the load balance index. According to an example implementation of the present disclosure, the load balance index may be determined based on other formulas. For example, the load balance index may be determined based on a product of the device correlation and the access load.

According to an example implementation of the present disclosure, the load balance index may be updated based on the wear degree of a storage device. Specifically, the wear degree of a storage device may be determined, and the wear degrees of multiple storage devices may be determined respectively. The wear degree may have various representations. For example, at least any one of the following may be used to represent the wear degree: the number of write operations that have been performed, a ratio of the number of write operations that have been performed to a preset threshold, the wear increment determined according to the method described above, and so on. Then, the load balance index of this storage device may be updated based on the wear degree of this storage device and the wear degrees of the multiple storage devices. According to an example implementation of the present disclosure, the load balance index $C_{Disk\ i}$ of the ith storage device may be determined based on the following Formula 5.

$$C_{Disk\ i} = \omega_\gamma \cdot \frac{\gamma_{Disk\ i}}{\sum_{j=0}^{M-1} \gamma_{Disk\ j}} + \omega_W \cdot \frac{W_{Disk\ i}}{\sum_{j=0}^{M-1} W_{Disk\ j}} \qquad \text{Formula 5}$$

where $C_{Disk\ i}$ represents the load balance index of the ith storage device, $\gamma_{Disk\ i}$ represents the device correlation of the ith storage device, $\gamma_{Disk\ j}$ represents the device correlation of the jth storage device, M represents the number of storage devices in the resource pool, $W_{Disk\ i}$ represents the wear degree of the ith storage device, $\sum_{j=0}^{M-1} W_{Disk\ i}$ represents the sum of the wear degrees of all the M storage devices, and $\omega_\gamma$ and $\omega_W$ respectively represent weights related to device correlation and wear degree. It will be understood that Formula 5 above is only a schematic way to determine the load balance index. According to an example implementation of the present disclosure, the load balance index may be determined based on other formulas. For example, the load balance index may be determined based on a product of the device correlation and the wear degree.

According to an example implementation of the present disclosure, the load balance index $C_{Disk\ i}$ of the ith storage device may be determined based on the following Formula 6.

$$C_{Disk\ i} = \omega_\gamma \cdot \frac{\gamma_{Disk\ i}}{\sum_{j=0}^{M-1} \gamma_{Disk\ j}} + \omega_T \cdot \frac{T_{Disk\ i}}{\sum_{j=0}^{M-1} T_{Disk\ j}} + \omega_W \cdot \frac{W_{Disk\ i}}{\sum_{j=0}^{M-1} W_{Disk\ j}} \quad \text{Formula 6}$$

where $C_{Disk\ i}$ represents the load balance index of the ith storage device, $\gamma_{Disk\ i}$ represents the device correlation of the ith storage device, $\gamma_{Disk\ j}$ represents the device correlation of the jth storage device, M represents the number of storage devices in the resource pool, $T_{Disk\ i}$ represents the access load of the ith storage device, $\Sigma_{j=0}^{M-1} T_{Disk\ j}$ represents the sum of the access loads of all the M storage devices, $W_{Disk\ i}$ represents the wear degree of the ith storage device, $\Sigma_{j=0}^{M-1} W_{Disk\ i}$ represents the sum of the wear degrees of all the M storage devices, and $\omega_\gamma$, $\omega_T$ and $\omega_W$ respectively represent weights related to device correlation, access load, and wear degree.

It will be understood that Formula 6 above is only a schematic way to determine the load balance index. According to an example implementation of the present disclosure, the load balance index may be determined based on other formulas. For example, the load balance index may be determined based on a product of stripe distribution, access load, and wear degree. According to an example implementation of the present disclosure, value ranges of $\omega_\gamma$, $\omega_T$, and $\omega_W$ may be set. For example, $\omega_\gamma + \omega_T + \omega_W = 1$ can be defined. According to an example implementation of the present disclosure, a value range may be specified for each weight. For example, the value range of each weight may be determined based on the following Table 1.

TABLE 1

| Value ranges of weights | |
|---|---|
| Weight | Value range |
| $\omega_W$ | 0.6-1 |
| $\omega_T$ | 0-0.2 |
| $\omega_\gamma$ | 0-0.2 |

It will be understood that Table 1 above only schematically illustrates a specific example of the value ranges. Since the example implementations according to the present disclosure are more concerned with the wear degree of a device, the weight $\omega_W$ of the wear degree can be set to a high value.

How to determine the load balance index of each storage device has been described above, and how to select source and destination storage devices based on the load balance index will be described below. It will be understood that the larger the value of $C_{Disk\ i}$, the more the workload of the ith storage device deviates from the average value. According to an example implementation of the present disclosure, a storage device with a high load balance index may first be selected as the source storage device, and a storage device with a low load balance index may be selected as the destination storage device.

Specifically, if the load balance index $C_{Disk\ i}$ of the ith storage device is higher than the load balance index $C_{Disk\ j}$ of the jth storage device in the multiple storage devices, the ith storage device may be selected. In this way, a storage device with a poor balance degree may be found preferentially, and extents in this storage device may be preferentially moved to other storage devices to reduce the workload of the storage device. According to an example implementation of the present disclosure, the load balance indexes of all the storage devices may be compared, and a storage device with the highest load balance index may be selected. In this way, a storage device with the worst balance degree may be quickly found in a convenient and effective manner.

Further, a source extent may be selected from a set of extents in the source storage device that have been allocated. It will be understood that, at this time, the source storage device is the storage device with the worst load balance index in the multiple storage devices, and moving any extent in the source storage device to other storage devices will improve the load balance index of the source storage device. According to an example implementation of the present disclosure, in order to improve the balance of the source storage device more quickly, an extent that has the greatest impact on the load balance index may be selected from the source storage device, and data in this extent may be moved to other storage devices.

It will be understood that the load balance index of a storage device is associated with stripes in which all the extents in that storage device are located, and the impact of the stripes in which all the extent are located on the load balance index can be determined on a one-by-one basis. Specifically, for a given extent in a set of extents in the source storage device that have been allocated, the impact of the stripe in which the given extent is located on the load balance index of the storage device may be determined, and thus the extent with the greatest impact on the load balance index of the source storage device can be selected as the source extent.

After the source extent and the destination storage device have been determined, data in the source extent can be moved to an idle extent in the destination storage device. It will be understood that since moving the data will change the distribution of stripes in the storage system, it will be necessary to determine the load balance index prediction of the destination storage device after the source extent has been moved to the idle extent in the destination storage device. If the load balance index of the source storage device is higher than the load balance index prediction, the data in the source extent is moved to the idle extent in the destination storage device. Here, the load balance index of the source storage device is higher than the load balance index prediction of the destination storage device, which means that moving the data can improve the load balance index of the storage device, so data in the source extent can be moved to the idle extent in the destination storage device. Otherwise, it means that moving the data will cause a more serious imbalance, so the operation of moving the data will not be performed.

Figure 9:
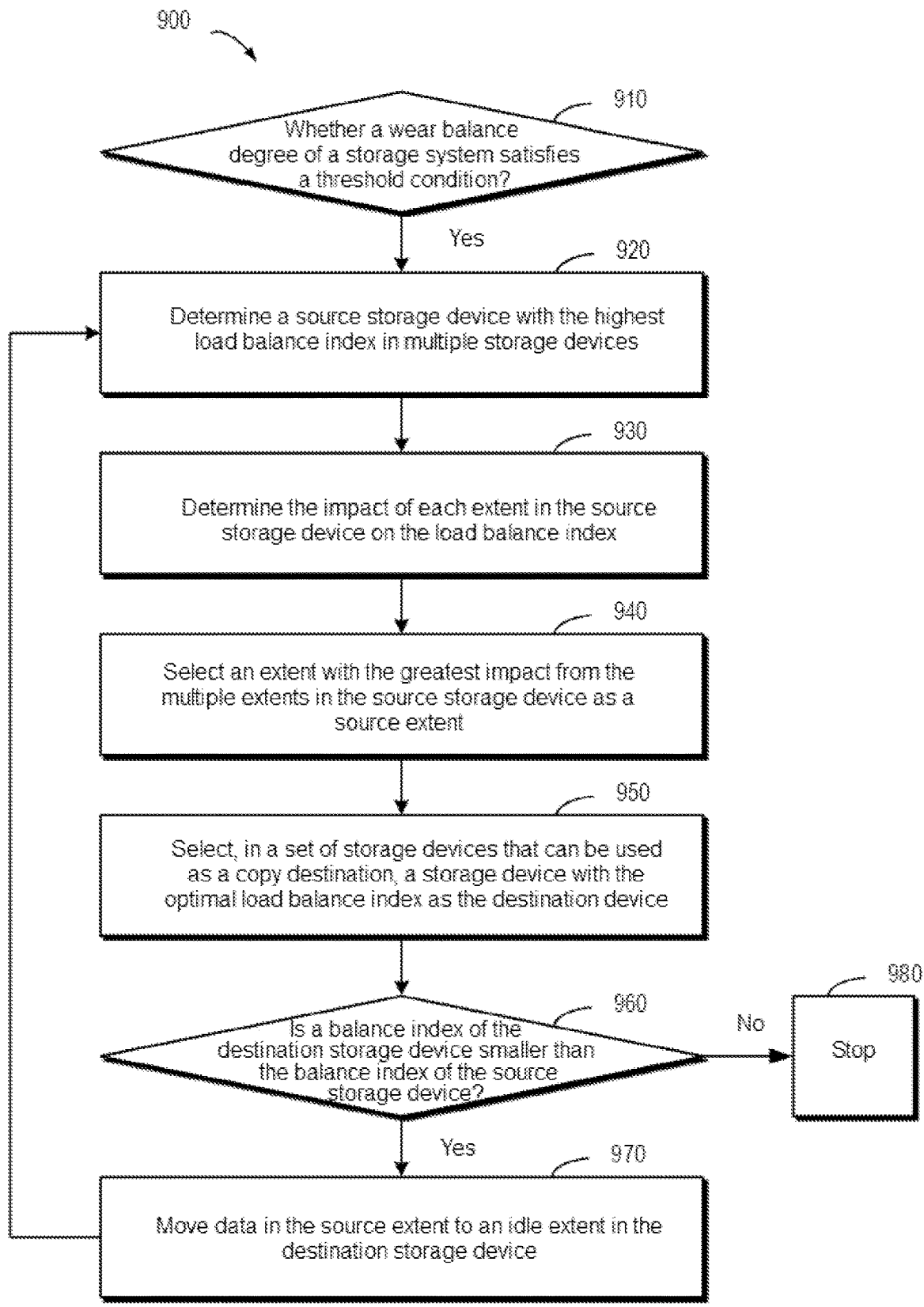
FIG. 9 schematically illustrates a flow chart of a method for performing wear degree balancing according to an implementation of the present disclosure.

Hereinafter, a method for performing re-balancing according to an example implementation of the present disclosure will be described in detail. FIG. 9 schematically illustrates a flow chart of method 900 for performing load balancing according to an implementation of the present disclosure. At block 910, it can be determined whether a wear balance degree of a storage system satisfies a threshold condition. If the threshold condition is satisfied, method 900 proceeds to block 920. At block 920, a storage device (i.e., a source storage device) with the highest load balance index in multiple storage devices can be determined. The load balance index of each storage device can be determined based on any of Formulas 2 to 6 described above, and the storage device with the largest load balance index can be used as the source storage device.

At block 930, the impact of each extent in the source storage device on the load balance index can be determined. At block 940, an extent with the greatest impact may be selected. At block 950, in a set of storage devices that can be used as a copy destination, a storage device with the optimal load balance index is selected as the destination storage device. At block 960, the load balance index prediction of the destination storage device after copying can be determined and compared with the load balance index of the source storage device. If the load balance index prediction of the destination storage device is smaller than the load balance index of the source storage device, method 900 proceeds to block 970 to move data in the source extent to an idle extent in the destination storage device.

According to an example implementation of the present disclosure, the moving operation may be performed in multiple rounds. For example, after block 970, method 900 may return to block 920 and perform the next round of operations until the determination result at block 960 is "No," then method 900 proceeds to block 980 and stops. With the example implementation of the present disclosure, the load balancing process can be performed centrally for multiple rounds. In this way, it can be ensured that the load balance index of the storage system will remain in a good state for a long time period in the future, and that the load balancing process will not be performed frequently.

Examples of the method according to the present disclosure have been described in detail above with reference to FIGS. 2 to 9, and implementations of a corresponding apparatus will be described below. According to an example implementation of the present disclosure, an apparatus for managing a wear degree of a storage system is provided. The apparatus includes: receiving respectively, for multiple storage devices in the storage system, multiple access histories of the multiple storage devices in a previous time period; a determining module configured to determine respectively multiple wear increments of the multiple storage devices at a future time point based on the multiple access histories of the multiple storage devices; an acquiring module configured to acquire a wear balance degree of the storage system at the future time point based on the multiple wear increments of the multiple storage devices at the future time point; and a migrating module configured to migrate data among the multiple storage devices of the storage system in response to determining that the wear balance degree satisfies a preset condition. According to an example implementation of the present disclosure, the apparatus further includes modules for performing methods 500 to 900 described above.

Figure 10:
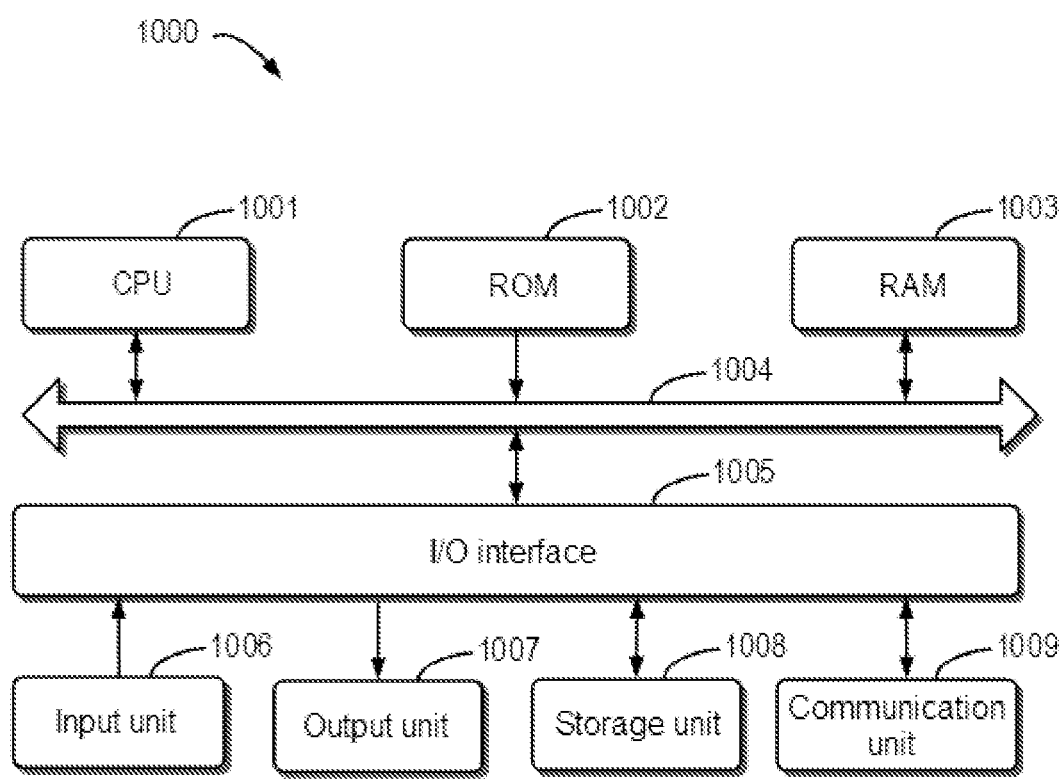
FIG. 10 schematically illustrates a block diagram of a device for managing a wear degree of a storage system according to an example implementation of the present disclosure.

FIG. 10 schematically illustrates a block diagram of device 1000 for managing the load balancing of a storage system according to an example implementation of the present disclosure. As shown in the drawing, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of storage device 1000 may also be stored. CPU 1001, ROM 1002, and RAM 1003 are connected to each other via bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices over a computer network such as the Internet and/or various telecommunication networks.

Various processes and processing described above, such as methods 500 and 900, may be performed by processing unit 1001. For example, in some implementations, methods 500 and 900 may be implemented as a computer software program that is tangibly contained in a machine-readable medium, such as storage unit 1008. In some implementations, some or all of the computer program may be loaded and/or installed onto device 1000 via ROM 1002 and/or communication unit 1009. When the computer program is loaded to RAM 1003 and executed by CPU 1001, one or more steps of methods 500 and 900 described above may be performed. Alternatively, in other implementations, CPU 1001 may also be configured in any other suitable manner to implement the above-mentioned processes/methods.

According to an example implementation of the present disclosure, an electronic device is provided. The electronic device includes: at least one processor; and a memory coupled to the at least one processor, wherein the memory has instructions stored therein which, when executed by the at least one processor, cause the device to perform actions for managing the load balancing of a storage system. The actions include: receiving respectively, for multiple storage devices in the storage system, multiple access histories of the multiple storage devices in a previous time period; determining respectively multiple wear increments of the multiple storage devices at a future time point based on the multiple access histories of the multiple storage devices; acquiring a wear balance degree of the storage system at the future time point based on the multiple wear increments of the multiple storage devices at the future time point; and migrating data among the multiple storage devices of the storage system in response to determining that the wear balance degree satisfies a preset condition.

According to an example implementation of the present disclosure, determining respectively the multiple wear increments of the multiple storage devices at the future time point includes: for a storage device in the multiple storage devices, determining, based on an access history of the storage device in the multiple access histories, a change pattern of multiple access loads of the storage device at multiple time points in the previous time period; determining a wear increment history of the storage device in the previous time period based on the multiple access loads and the change pattern; and determining the wear increment of the storage device at the future time point based on the wear increment history.

According to an example implementation of the present disclosure, determining the wear increment history includes: determining the wear increment history based on a linear fitting of the multiple access loads in response to determining that the change pattern of the storage device is a trend change pattern.

According to an example implementation of the present disclosure, determining the wear increment history includes: determining the wear increment history based on an extreme value among the multiple access loads in response to determining that the change pattern of the storage device is a periodic change pattern.

According to an example implementation of the present disclosure, determining the wear increment of the storage device at the future time point includes: determining, based on a difference between the future time point and a current time point, a time period corresponding to the difference in the previous time period, wherein the length of the previous time period is greater than the difference; and determining the wear increment of the storage device at the future time point based on the time period and the wear increment history.

According to an example implementation of the present disclosure, determining the wear increment history includes: determining the wear increment history based on an accumulation of the multiple access loads in response to determining that the change pattern of the storage device is an irregular change pattern.

According to an example implementation of the present disclosure, data in the storage system is stored in a set of stripes, stripes in the set of stripes including multiple extents from at least part of the multiple storage devices, and migrating the data among the multiple storage devices of the storage system includes: selecting respectively a source storage device and a destination storage device from the multiple storage devices based on load balance indexes of storage devices in the multiple storage devices; and moving data in the source storage device to an idle extent in the destination storage device.

According to an example implementation of the present disclosure, moving the data includes: selecting, for multiple extents in the source storage device, an extent in the multiple extents that has a great impact on a load balance index of the storage device as a source extent; and determining a load balance index prediction of the destination storage device after data in the source extent is moved to the idle extent in the destination storage device; and moving the data in the source extent to the idle extent in the destination storage device according to a determination that the load balance index of the source storage device is higher than the load balance index prediction of the destination storage device.

According to an example implementation of the present disclosure, the load balance index of the storage device includes a device correlation, the device correlation representing the distribution of the set of stripes involved by the storage system between the storage device and other storage devices than the storage device.

According to an example implementation of the present disclosure, the load balance index of the storage device further includes at least any one of an access load and a wear degree of the storage device.

According to an example embodiment of the present disclosure, a computer program product is provided, the computer program product being tangibly stored on a non-transitory computer-readable medium and including machine-executable instructions which are used to implement the method according to the present disclosure.

According to the example implementation of the present disclosure, a computer-readable medium is provided. The computer-readable medium store machine-executable instructions which, when executed by at least one processor, cause the at least one processor to implement the method according to the present disclosure.

The present disclosure may be a method, a device, a system, and/or a computer program product. The computer program product may include a computer-readable storage medium, on which computer-readable program instructions used for executing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The computer-readable program instructions are received by a network adapter card or network interface of each computing/processing device from the network, and are forwarded to be stored in the computer-readable storage medium of each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as a separate software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow chart and/or block diagrams and combinations of blocks in the flow charts and/or block diagrams may be implemented by the computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. The computer-readable program instructions may also be stored in the computer-readable storage medium, and the instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flow charts and/or block diagrams.

The computer-readable program instructions may also be loaded onto computers, other programmable data processing apparatuses, or other devices, so that a series of operating steps may be executed on the computers, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should also be noted that each block in the block diagrams and/or flow charts and a combination of blocks in the block diagrams and/or flow charts may be implemented by a dedicated hardware-based system for executing specified functions or actions, or may be implemented by a combination of dedicated hardware and computer instructions.

Various implementations of the present disclosure have been described above. The above description is illustrative and not exhaustive, and is not limited to the various implementations disclosed. Many modifications and variations will be apparent to those of ordinary skill in the art without departing from the scope and spirit of the illustrated various implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing a wear degree of a storage system, including:
   receiving respectively, for multiple storage devices in the storage system, multiple access histories of the multiple storage devices in a previous time period;
   determining respectively multiple wear increments of the multiple storage devices at a future time point based on the multiple access histories of the multiple storage devices;
   acquiring a wear balance degree of the storage system at the future time point based on the multiple wear increments of the multiple storage devices at the future time point; and
   migrating data among the multiple storage devices of the storage system in response to determining that the wear balance degree satisfies a preset condition;
   wherein determining respectively the multiple wear increments of the multiple storage devices at the future time point includes: for a storage device in the multiple storage devices,
   determining, based on an access history of the storage device in the multiple access histories, a change pattern of multiple access loads of the storage device at multiple time points in the previous time period;
   determining a wear increment history of the storage device in the previous time period based on the multiple access loads and the change pattern; and
   determining the wear increment of the storage device at the future time point based on the wear increment history.

2. The method according to claim 1, wherein determining the wear increment history includes:
   determining the wear increment history based on a linear fitting of the multiple access loads in response to determining that the change pattern of the storage device is a trend change pattern.

3. The method according to claim 1, wherein determining the wear increment history includes:
   determining the wear increment history based on an extreme value among the multiple access loads in response to determining that the change pattern of the storage device is a periodic change pattern.

4. The method according to claim 3, wherein determining the wear increment of the storage device at the future time point includes:
   determining, based on a difference between the future time point and a current time point, a time period corresponding to the difference in the previous time period, wherein the length of the previous time period is greater than the difference; and
   determining the wear increment of the storage device at the future time point based on the time period and the wear increment history.

5. The method according to claim 1, wherein determining the wear increment history includes:
   determining the wear increment history based on an accumulation of the multiple access loads in response to determining that the change pattern of the storage device is an irregular change pattern.

6. The method according to claim 1, wherein data in the storage system is stored in a set of stripes, stripes in the set of stripes including multiple extents from at least part of the multiple storage devices, and migrating the data among the multiple storage devices of the storage system includes:
selecting respectively a source storage device and a destination storage device from the multiple storage devices based on load balance indexes of storage devices in the multiple storage devices; and
moving data in the source storage device to an idle extent in the destination storage device.

7. The method according to claim 6, wherein moving the data includes:
selecting, for multiple extents in the source storage device, an extent in the multiple extents that has a great impact on a load balance index of the storage device as a source extent;
determining a load balance index prediction of the destination storage device after data in the source extent is moved to the idle extent in the destination storage device; and
moving the data in the source extent to the idle extent in the destination storage device according to a determination that the load balance index of the source storage device is higher than the load balance index prediction of the destination storage device.

8. The method according to claim 6, wherein the load balance index of the storage device includes a device correlation, the device correlation representing the distribution of the set of stripes involved by the storage system between the storage device and other storage devices than the storage device.

9. The method according to claim 8, wherein the load balance index of the storage device further includes at least any one of an access load and a wear degree of the storage device.

10. The method according to claim 1, wherein receiving includes:
receiving the multiple access histories while the multiple storage devices store at least some of the data within a Redundant Array of Independent Disks (RAID).

11. The method according to claim 10, further comprising:
prior to storing at least some of the data within the RAID, arranging extents of the RAID to protect the data in accordance with a particular RAID protection scheme.

12. An electronic device, including:
at least one processor; and
a memory coupled to the at least one processor, wherein the memory has instructions stored therein which, when executed by the at least one processor, cause the device to perform actions for managing a wear degree of a storage system, the actions including:
receiving respectively, for multiple storage devices in the storage system, multiple access histories of the multiple storage devices in a previous time period;
determining respectively multiple wear increments of the multiple storage devices at a future time point based on the multiple access histories of the multiple storage devices;
acquiring a wear balance degree of the storage system at the future time point based on the multiple wear increments of the multiple storage devices at the future time point; and
migrating data among the multiple storage devices of the storage system in response to determining that the wear balance degree satisfies a preset condition;
wherein determining respectively the multiple wear increments of the multiple storage devices at the future time point includes: for a storage device in the multiple storage devices,
determining, based on an access history of the storage device in the multiple access histories, a change pattern of multiple access loads of the storage device at multiple time points in the previous time period;
determining a wear increment history of the storage device in the previous time period based on the multiple access loads and the change pattern; and
determining the wear increment of the storage device at the future time point based on the wear increment history.

13. The device according to claim 12, wherein determining the wear increment history includes:
determining the wear increment history based on a linear fitting of the multiple access loads in response to determining that the change pattern of the storage device is a trend change pattern.

14. The device according to claim 12, wherein determining the wear increment history includes:
determining the wear increment history based on an extreme value among the multiple access loads in response to determining that the change pattern of the storage device is a periodic change pattern.

15. The device according to claim 14, wherein determining the wear increment of the storage device at the future time point includes:
determining, based on a difference between the future time point and a current time point, a time period corresponding to the difference in the previous time period, wherein the length of the previous time period is greater than the difference; and
determining the wear increment of the storage device at the future time point based on the time period and the wear increment history.

16. The device according to claim 12, wherein determining the wear increment history includes:
determining the wear increment history based on an accumulation of the multiple access loads in response to determining that the change pattern of the storage device is an irregular change pattern.

17. The device according to claim 12, wherein data in the storage system is stored in a set of stripes, stripes in the set of stripes including multiple extents from at least part of the multiple storage devices, and migrating the data among the multiple storage devices of the storage system includes:
selecting respectively a source storage device and a destination storage device from the multiple storage devices based on load balance indexes of storage devices in the multiple storage devices; and
moving data in the source storage device to an idle extent in the destination storage device.

18. The device according to claim 17, wherein moving the data includes:
selecting, for multiple extents in the source storage device, an extent in the multiple extents that has a great impact on a load balance index of the storage device as a source extent; and
determining a load balance index prediction of the destination storage device after data in the source extent is moved to the idle extent in the destination storage device; and moving the data in the source extent to the idle extent in the destination storage device according to a determination that the load balance index of the source storage device is higher than the load balance index prediction of the destination storage device.

19. The device according to claim 17, wherein the load balance index of the storage device includes a device correlation, the device correlation representing the distribution of the set of stripes involved by the storage system between the storage device and other storage devices than the storage device; and wherein the load balance index of the storage device further includes at least any one of an access load and a wear degree of the storage device.

20. A computer program product having a non-transitory computer readable medium which stores a set of instructions to manage a wear degree of a storage system; the set of instructions, when carried out by computerized circuitry, causing the computerized circuitry to perform a method of:

receiving respectively, for multiple storage devices in the storage system, multiple access histories of the multiple storage devices in a previous time period;

determining respectively multiple wear increments of the multiple storage devices at a future time point based on the multiple access histories of the multiple storage devices;

acquiring a wear balance degree of the storage system at the future time point based on the multiple wear increments of the multiple storage devices at the future time point; and migrating data among the multiple storage devices of the storage system in response to determining that the wear balance degree satisfies a preset condition;

wherein determining respectively the multiple wear increments of the multiple storage devices at the future time point includes: for a storage device in the multiple storage devices, determining, based on an access history of the storage device in the multiple access histories, a change pattern of multiple access loads of the storage device at multiple time points in the previous time period;

determining a wear increment history of the storage device in the previous time period based on the multiple access loads and the change pattern; and determining the wear increment of the storage device at the future time point based on the wear increment history.

\* \* \* \* \*